United States Patent [19]

Godot

[11] 4,051,601
[45] Oct. 4, 1977

[54] FEELER FOR CONTOUR READING APPARATUS

[75] Inventor: Jean Marie Godot, Brunoy, France

[73] Assignee: Essilor International, Cie Generale d'Optique, France

[21] Appl. No.: 647,313

[22] Filed: Jan. 6, 1976

[30] Foreign Application Priority Data

Jan. 10, 1975 France .............................. 75.00635

[51] Int. Cl.² ........................... G01B 7/28; B24B 9/14
[52] U.S. Cl. .................................... 33/174 P; 33/200; 51/101 LG
[58] Field of Search ................. 33/174 P, 174 A, 200; 51/101 LG, 105 LG, 127

[56] References Cited

U.S. PATENT DOCUMENTS

| 3,170,374 | 2/1965 | Clar | 51/101 LG |
|---|---|---|---|
| 3,555,739 | 1/1971 | Novak | 51/101 LG |
| 3,786,600 | 1/1974 | Bloxsom | 51/101 LG |
| 3,899,851 | 8/1975 | Asselin et al. | 51/101 LG |

FOREIGN PATENT DOCUMENTS

| 1,543,450 | 9/1968 | France |
| 2,229,213 | 11/1974 | France |

Primary Examiner—Charles E. Phillips
Assistant Examiner—Richard R. Stearns
Attorney, Agent, or Firm—Diller, Brown, Ramik & Wight

[57] ABSTRACT

A feeler for reading the contour of the rim of a spectacle frame has a reading head on a rod carried by a support which is linked by a ball joint to a fixed base. A cylindrical skirt on the support co-operates with the base and with a displacement detector which provides an indication which is employed to maintain contact of the rim with the reading head.

15 Claims, 10 Drawing Figures

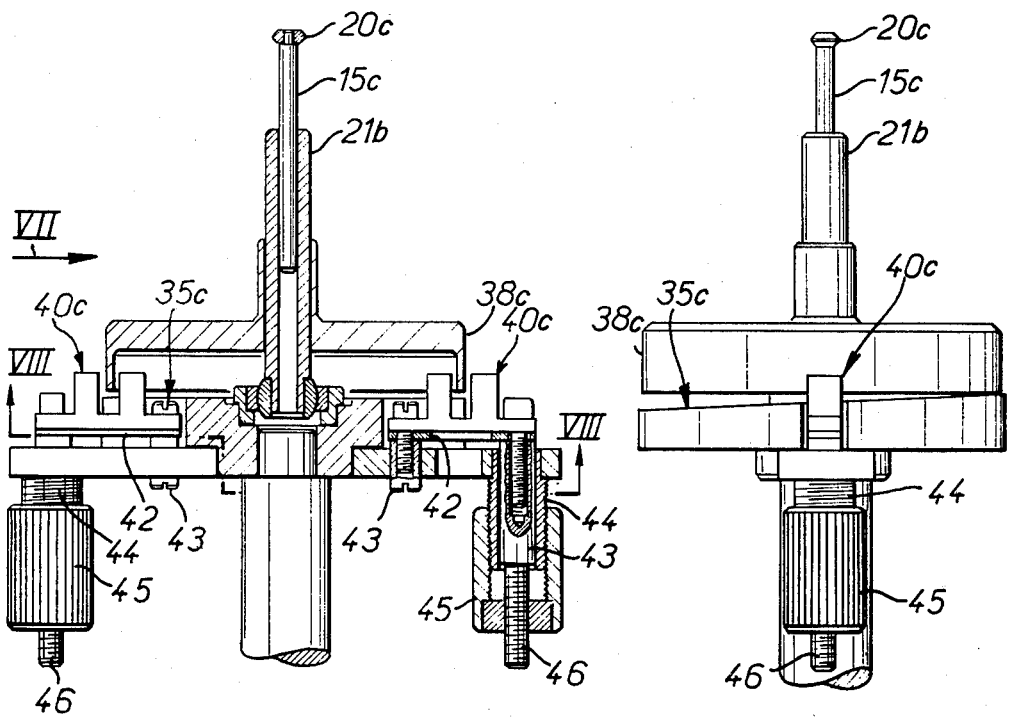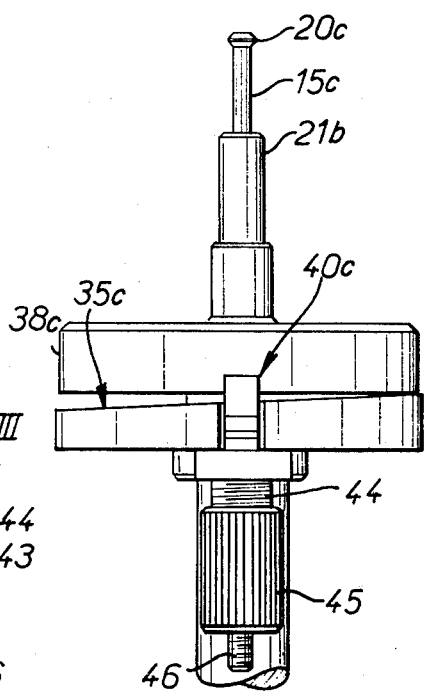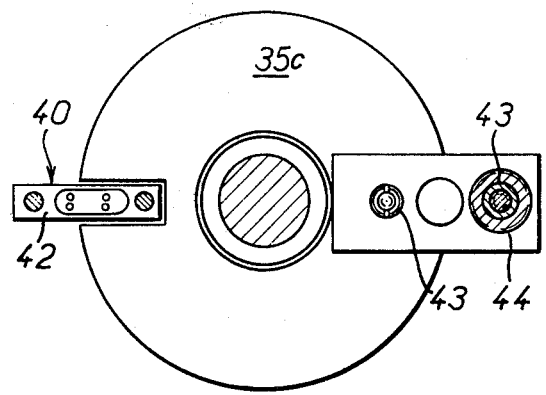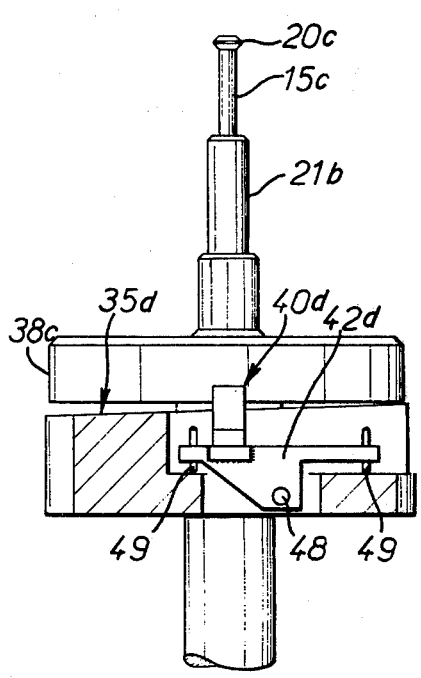

FEELER FOR CONTOUR READING APPARATUS

BACKGROUND OF THE INVENTION

The present invention relates generally to the reading of the particular contour of the rims of any spectacle frame for the purpose of cutting ophthalmic lenses for mounting in those rims, this reading of the contour permitting either direct cutting of lenses in a machine for trimming and bevelling ophthalmic lenses, or indirect cutting by making reproduction templates which can then be mounted in such a machine.

Several particular problems have to be overcome in contour reading in this manner in order to ensure that the contour reading will subsequently permit the cutting of an ophthalmic lens whose contour corresponds as accurately as possible to the contour of the rim in which the lens has to be mounted.

Firstly, it is desirable to follow the bottom of the bezel provided in the rim which is being read, because the contour of this bezel actually determines the peripheral contour of the ophthalmic lens to be mounted in the rim.

In addition, the "meniscus" effect usually present in a rim of this kind must also be taken into account, that is to say the curvature of the surface on which the rim can as a whole be inscribed.

Finally, it is desirable that the contour should be read by reference to the plane tangential to this contour, in such a manner as to follow any variation of curvature thereof as closely as possible, particularly in the zones where these variations of curvature are greatest.

The expression "tangential plane" means a plane which contains the tangent to the point in question on the contour of the bezel of the rim being read, and which is perpendicular to the medium plane of this rim, which is assumed to be plane, and therefore parallel to the optical axis of the ophthalmic lens which is to be mounted in the rim.

Contour readers proposed hitherto for reading the contour of spectacle rims do not satisfactorily comply with the requirements briefly set forth above.

Generally contour readers of this kind comprise one or more feelers with which the rim of the spectacle frame whose contour is to be read must be kept permanently in contact, these readers being additionally provided for this purpose with a support plate to which is fastened in appropriate manner a spectacle frame whose rim contour has to be read, this support plate being mounted for translational movement by displacement control means in order to apply the rim being read against the feeler or feelers for rotation about the geometrical axis of the said rim, and for rotation by pivoting about the corresponding point of contact, while a second support plate synchronised with the first-mentioned plate also carries, facing a cutting tool, either the template or the ophthalmic lens which is to be cut.

In a known apparatus of this kind there are a plurality of feelers, actually cams, each of which has an arm extending parallel to the optical axis of the rim being read, and in contact with the inside contour of the said rim.

Such feelers or cams are not able to follow the contour of the bezel of the rim which they are reading, neither do they take into account the meniscus effect of a rim of this kind.

In another known countour reader the feeler is a rod provided with a reading head which is adapted to co-operate with the bezel of the spectacle frame rim.

In this reader however, although the rod carrying the reading head is mounted for axial sliding in its support, no particular arrangements are made for taking into account the meniscus effect of the rim being read; on the contrary this rod is locked axially in its support during reading.

In yet another known reader the feeler is also in the form of a rod which is provided with a reading head which is articulated on the rod about an axis perpendicular to the axis of the rod.

This arrangement actually enables the reading head to follow correctly the bottom of the bezel of the rim of the spectacle frame being read, despite the meniscus effect of the rim. However the precise modifications of angular orientation of this reading head relative to the rod which carries it in order to enable the head to follow the bezel taking into account the meniscus effect of the bezel, cannot fail to give a false reading.

Furthermore, the contour readers briefly described above have the common disadvantage of lack of sensitivity in relation to the tangential plane at the reading point, as defined above, and therefore do not permit accurate analysis of the contour read, particularly in zones where the radius of curvature of this contour varies rapidly.

In order to overcome this disadvantage it has also been proposed to use two feelers simultaneously which feelers are at a distance from each other.

This provides better sensitivity in relation to the tangential plane at the point of reading of the contour, but it results in relative complexity of the apparatus. In addition the apparatus does not take into account the meniscus effect of the contour which is to be read.

It is a main object of the present invention to permit the reading of a contour, and in particular the reading of the contour of the bezel of a spectacle frame rim, which provides satisfactorily the requirements briefly explained above, namely the requirement of taking into account the meniscus effect which may be present in the contour which is to be read, and the requirement of sensitivity to the tangential plane at the point of reading of this contour.

SUMMARY

According to the invention there is provided a feeler for a contour reading apparatus for the bezel of a spectacle frame rim. The feeler is carried by a support and is provided with a reading head which is adapted to co-operate with the bezel of a spectacle frame rim.

The support carries at one end the inner annular element of a ball joint whose outer annular element is carried by a fixed base and the support also carries a cylindrical skirt which is disposed coaxially around said support and the free edge of which co-operates with said base and with at least one displacement detector.

As the result of this arrangement, when the tangential plane at the reading point of the bezel being read is not perpendicular to the plane selected as reference plane, which contains the axis of the feeler and the rocking axis about which the feeler is pivotable, the feeler is subjected to a force by the spectacle frame applied against it, and it is therefore caused to pivot about a rocking axis.

This pivoting, which is detected by the displacement detector, controls rotation of a support plate for the spectacle frame being read, this rotation being such as to cancel the pivoting force to which the feeler is subjected by the frame and return the tangential plane at the reading point to a position perpendicular to the reference plane.

The tangential plane at the reading point of the contour being analysed thus remains systematically in a predetermined position relative to the reference plane selected. This leads to a particularly strict analysis of this contour and permits very accurate reproduction of the contour.

Furthermore, it is advantageous for the rod of the feeler to be slidably mounted in its support, thus enabling the reading head of the feeler to follow exactly the bezel being read, despite the meniscus effect of the latter, and without detriment to the accuracy of the reading being made.

BRIEF DESCRIPTION OF THE DRAWINGS

FIG. 6 is a view partly in axial section and partly in side elevation of another form of the feeler shown in FIG. 5;

FIG. 7 is a side view of this feeler in the direction of the arrow VII in FIG. 6;

FIG. 8 is a view of the feeler of FIG. 6 in cross-section on the line VII—VIII in FIG. 6; and FIG. 9 is a side view, partly in section, similar to FIG. 7 and relates to another construction of feeler according to the invention.

DESCRIPTION OF THE PREFERRED EMBODIMENTS

A known contour reading apparatus which can be adapted to include a feeler according to the invention comprises a support plate 10 to which a spectacle frame, the contour of whose rim has to be read, can be suitably fastened, for example with the aid of jaws or clamps, not shown, which are preferably carried by the plate 10 in such a manner as to be adjustable in position.

Such adjustable jaws or clamps can be adapted to various types of spectacle frames the contour of whose rim has to be read, and permit the mounting of a spectacle frame in a predetermined manner relative to fixed references, in order that the geometrical axis of the rim being read may occupy a predetermined position relative to those references.

Such arrangements are well known and will not be described in detail.

Figure 1:
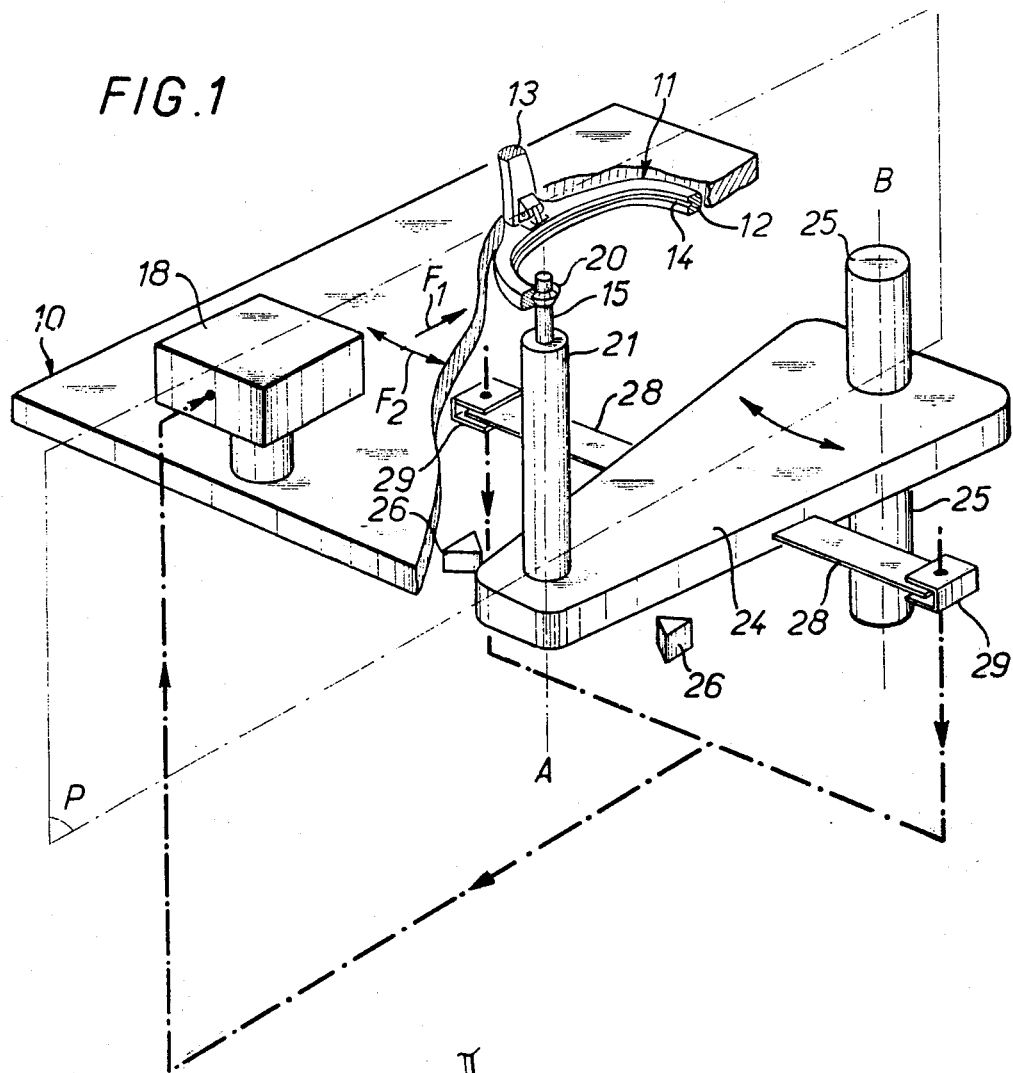
FIG. 1 is a general view in perspective of a contour reading apparatus known to applicant.

FIG. 1 shows only part of a spectacle frame 11, which is assumed to be suitably fastened to the support plate 10 in the above mentioned manner.

More precisely, FIG. 1 shows partially one of the rims 12 of a spectacle frame 11, with the side piece 13 which is hinged to the rim.

In the usual manner this rim 12 has in its inner contour a groove 14 having an angular bottom and known as a bezel, this groove being provided to position and hold an ophthalmic lens.

The ophthalmic lens must have a peripheral contour identical in shape to the internal contour of the rim 12, and on the peripheral edge of the lens must be bevelled in such a manner as to be complementary to the bezel 14 which receives that peripheral edge.

As previously stated, the cutting of an ophthalmic lens of this kind is effected by a trimming and bevelling machine.

The cutting may be carried out directly with the aid of the spectacle frame 11 by reading the contour of the rim of the frame, as described below, or indirectly with the aid of an intermediate template cut from the said frame.

The contour reading apparatus is provided in the usual manner with a second plate adapted to support, facing a cutting tool, either a template or an ophthalmic lens which is to be cut. This second plate is fixed relative to the support plate 10 carrying the spectacle frame 11 which serves as guiding means for the cutting of the lens or template.

This second plate will not be described and illustrated here, because its operation is well known to those familiar with the art, and because it does not form part of the present invention.

The contour reading apparatus is provided with a feeler 15, which as a whole is fixed, and relative to which the support plate 10 carrying the spectacle frame 11 whose rim contour is to be read by the feeler 15 is mounted for translational movement, in order to apply the rim 12 against the feeler 15, as described below, for rotation about the geometrical axis of the rim 12, and is mounted for rotation by pivoting about the point of contact between the rim 12 and the feeler 15, that is to say the reading point.

FIG. 1 shows diagrammatically the displacement control means 18 which effects the translational movement necessary for applying the rim 12 against the feeler 15 in the direction of the arrow F1, and the rotation necessary for the pivoting of this rim 12 about the feeler 15, in the direction of the double arrow F2.

Such displacement control means, which will be known to those familiar with the art and which are customary in this technique, will not be described in detail here.

The feeler 15 comprises a rod which is relatively elongated axially, which carries a reading head 20 adapted to co-operate with the bezel 14 of a spectacle frame rim. The rod is mounted for axial movement in a complementary hollow tubular support 21.

The reading head 20 simply consists of an annular bead having a cross-section in the form of an outwardly projecting dihedron.

The feeler rod 15 is preferably not only free to slide axially in the support 21, but is also free to pivot about its axis relative to this support.

It is advantageous for the feeler 15 carrying the reading head 20 to be removable from the support 21, so that it is interchangeable. Certain metal frames have their bezels covered with a protective coating of polytetrafluoroethylene, this coating being removed before the lens is introduced into the corresponding rim.

It is therefore necessary to take the thickness of this coating into account and to reduce the dimension of the reading head 20 accordingly in order to permit accurate sensing.

Figure 2:
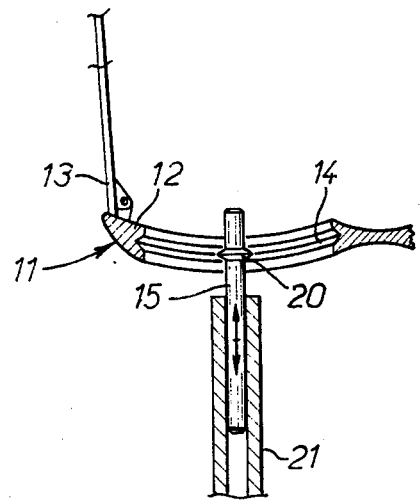
FIG. 2 is a view in partial axial section of the feeler of FIG. 1 and of a spectacle frame rim being read by this feeler.

In the apparatus illustrated in FIGS. 1 to 3, the support 21 is carried by a base 24 which is fastened on pivot pins 25 parallel to the support 21.

In this case the support 21 is therefore mounted for pivoting about a rocking axis B parallel to its own axis A.

In the example illustrated, fixed stops 26 are provided on each side of the base 24 to limit the movement of the support 21 about its rocking axis, so that, in the usual manner, this support 21 remains as a whole fixed and the feeler 15 carrying it constitutes a support stop for the spectacle frame rim whose contour is to be read.

At least one displacement detector is associated with the support 21 of the feeler 15, and the displacement control means 18 guiding the support plate 10 are under the control of this displacement detector.

In the apparatus illustrated in FIGS. 1 to 3 the base 24 carrying the support 21 of the feeler 15 is provided with lateral arms 28, and two displacement detectors 29 are disposed in fixed positions at the ends of these arms.

DIsplacement detectors of this kind are well known to those familiar with the art and will not be described in detail here. They may for example be of the photoelectric cell type, or else may be electromagnetic displacement detectors.

The detectors 29 respond to the displacement of the arms 28 of the base 24 and therefore to the pivoting of the support 21 of the feeler 15 about the geometrical axis of the pivot pins 25 forming the rocking axis B of this support. The displacement control means 18 of the support plate 10 operates under control of the detectors 29.

During operation the reading head 20 carried by the feeler 15 is engaged in the bezel 14 of the rim 12 whose contour is to be read.

The feeler 15 is consequently held axially by the rim 12, and is able to slide in the support 21 to account for the meniscus shape of the rim.

Rotation of the feeler 15 in the support 21 moreover minimises friction between the reading head 20 and the bezel 14 of the rim 12.

The plane passing through the geometrical axis A of the feeler 15 and through the geometrical axis B of the pivot pins 25 will hereinafter be designated P. This plane P, which is indicated in FIGS. 3A snd 3B, is selected as reference plane.

Figure 3A:
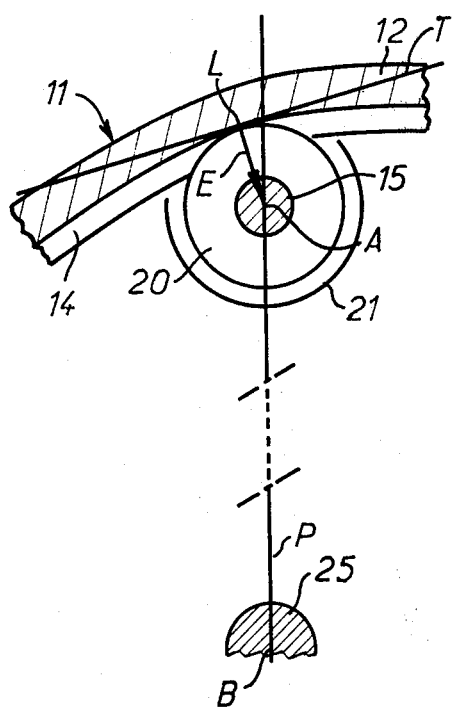
FIGS. 3A and 3B are views in partial cross-section of this feeler and of this spectacle frame rim, on a larger scale, illustrating the operation of the feeler.
Figure 3B:
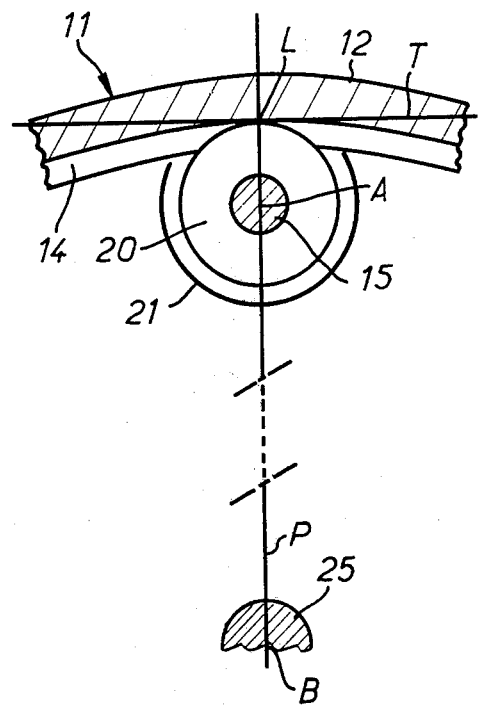

FIGS. 3A and 3B also show the position T of a plane tangential to the contour of the bottom of the bezel 14 at the reading point L which is the point of contact between the reading head 20 and the bezel 14.

If the tangential plane T is not perpendicular to the reference plane P, as shown in FIG. 3A, the force E to which the feeler 15 is subjected by the spectacle frame 11 applied against it will be inclined to the reference plane P, since the force E is perpendicular to the tangential plane T.

This force E therefore does not pass through the rocking axis B, and consequently the feeler 15 is subjected to a pivoting couple about this rocking axis.

The displacement detectors 29 read the pivoting of the base 24 which results therefrom, and control the pivoting about the reading point L of the plate 10 which carries the frame 11, in such a manner as to cancel the pivoting couple to which the feeler 15 is subjected, and therefore to bring the tangential plane T at the reading point L into a position perpendicular with the reference plane P as shown in FIG. 3B.

Consequently, because of this automatic control, the tangential plane at the reading point is always perpendicular to the reference plane.

The contour analysis made by this reading apparatus is therefore advantageously sensitive to the tangential plane to the contour read, and consequently permits correct cutting of the template or ophthalmic lens carried by a support plate moving in synchronism with the plate 10, even in the zones where the radius of curvature of the contour read varies rapidly.

Furthermore, because of the axial sliding of the feeler 15, the results of the analysis are not influenced by the meniscus effect of the contour which is read.

Figure 4:
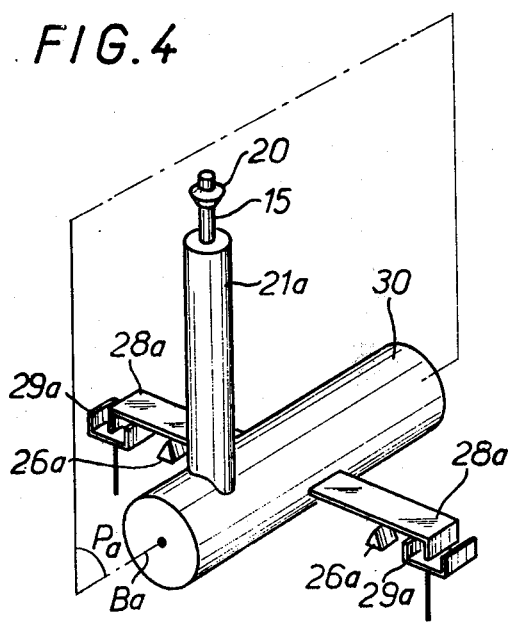
FIG. 4 is a partial view similar to FIG. 1 and illustrating a modified form of the feeler.
Figure 5:
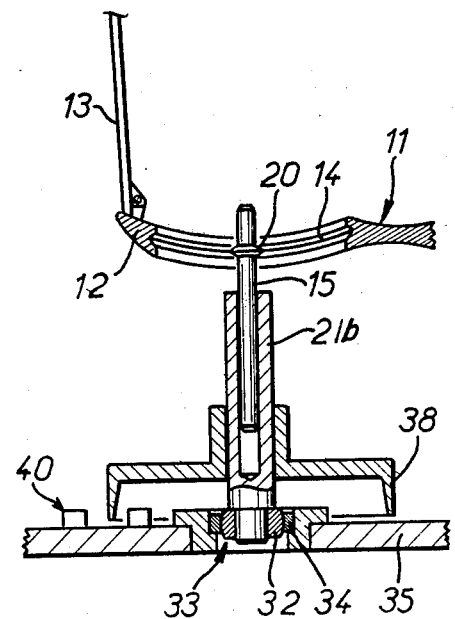
FIG. 5 is a view similar to FIG. 2 of a feeler according to the invention.

In the apparatus illustrated in FIG. 4, the support 21a of the feeler 15 is carried by a shaft 30 which is perpendicular to the support 21a and this support 21a is therefore mounted for pivoting about a rocking axis Ba of the shaft 30, which axis Ba is the axis of the support 21a.

As previously, the shaft 30 carrying the support 21a carries lateral arms 28a with which displacement detectors 29a are associated.

Likewise, as previously, fixed stops 26a are provided to limit the angular movement of the shaft 30 about its axis Ba.

The axis of the feeler 15 and the rocking axis Ba of the shaft 30 are coplanar.

In the embodiments of the invention illustrated in FIGS. 5 to 9, the support 21b for the feeler 15 is mounted in a ball joint. This support is therefore capable of pivoting about two rocking axes which are different from its own axis and are orthogonal to each other.

As previously, the feeler 15 is a rod mounted for axial movement in a support 21b, and at its lower end the support 21b carried the inner annular element 32 of a ball joint 33 whose outer annular element 34 is carried by a fixed base 35 which as a whole is perpendicular to the axis of the feeler 15.

The support 21b carries a cylindrical skirt 38 which is disposed coaxially around the support 21b. The free edge of the skirt 38 co-operates with the base 35 and with at least one displacement detector 40.

When at rest, the free edge of the skirt 38 is at all points at the same distance from the base 35.

When, because of the shape of the spectacle frame 11, the feeler 15 is subjected to any rocking about an axis passing through the centre of the ball joint 33, the corresponding movement of the skirt 38 is read by the displacement detector 40 which, as before, causes rotation about the reading point of the plate 10 carrying the frame 11, in such a manner as to cancel the rocking of the feeler 15.

In the modified embodiment illustrated in FIGS. 6 to 8 the base 35c is generally oblique relative to the axis of the feeler 15c, as is shown in FIG. 7, so that when at rest, and as illustrated in FIG. 7, the skirt 38c carried by the support 21b is in contact at one point with the base 35.

By this arrangement the ability of the feeler 15 to rock on each side of the position of rest is increased advantageously.

The base 35c may also have a curved surface facing the free edge of the skirt 38c, the convexity of this surface being turned towards the skirt.

Furthermore, in the example illustrated in FIGS. 6 to 8, there are two displacement detectors 40c arranged symmetrically one on each side of the plane passing through the axis of the feeler 15c. Each displacement detector 40c is carried by a plate 42 mounted so as to be adjustable in position parallel to itself by means of a micrometer adjustment device.

In practice the plate 42 carries two parallel pillars 43 mounted for axial sliding relative to the base 35c, one directly and the other with the aid of a sleeve 44 whose outer periphery is threaded and co-operates with a micrometer adjusting sleeve 44, which also co-operates with a screw 46 which has a thread different from that of the sleeve 44 and which is carried by the appropriate pillar 43.

In the modification illustrated in FIG. 9, each displacement detector 40d is carried by a plate 42d which is pivotally mounted at 48 on the base 35d under the control of micrometer adjustment screws 49 disposed at a distance from the corresponding pivot 48 and one on each side of the pivot 48.

I claim:

1. A contour feeler assembly for tracing the contour of a groove in the rim of a spectacle frame, said assembly comprising a relatively axially elongated rod having a tracing head shaped to operatively engage the groove of a spectacle frame, a support, means mounting said rod on said support, said support including an end portion remote from said tracing head, a base, means pivotally mounting said support on said base in the form of a ball joint including a first ball joint member secured to said end portion of said support and a second ball joint member secured to said base, a skirt, means mounting said skirt coaxial to said rod and for pivotal movement with said support, said skirt having a free edge facing said base, and at least one detecting means fixed relative to said base for detecting the position of the free edge of said skirt with respect to said base.

2. A feeler assembly according to claim 1, wherein said base has a surface facing said free edge of said skirt with said surface being generally oblique to said skirt free edge in the undisplaced position of the feeler assembly said skirt is in contact with said surface of the base at one location.

3. A feeler according to claim 1, wherein said base has a surface inclined relative to the free edge of said skirt in the undisplaced position of the feeler assembly.

4. A feeler assembly according to claim 1, wherein there is a plate carrying said detector means and wherein there are micrometer adjustment means between said plate and said base for translational adjustment of the position of said plate generally longitudinally of said rod.

5. A feeler assembly according to claim 1, wherein there is a plate carrying said detector means, means pivotally mounting said plate on said base and including micrometer adjustment means extending between said plate and said base for adjusting the angular position of said plate relative to said base.

6. A feeler assembly according to claim 1, wherein there are two of said detecting means, said two detecting means being disposed symmetrically one on each side of a plane passing through the axis of said rod when said feeler assembly is its undisplaced position.

7. A feeler assembly according to claim 1, wherein said mounting means for said rod includes means mounting said rod for axial sliding movement on said support.

8. A feeler assembly according to claim 1, wherein said mounting means for said rod includes means mounting said rod for rotation about its axis in relation to said support.

9. A feeler assembly according to claim 1, wherein said mounting means for said rod includes means detachably mounting said rod on said support for replacemet.

10. A feeler assembly according to claim 1, wherein said tracing head is of annular configuration which in cross-section has an outwardly projecting dihedron.

11. Apparatus for tracing the contour of a groove in a spectacle frame rim, said apparatus comprising a support plate for a spectacle frame; displacement control means connected to said support plate operable to effect translational movement of said support plate; a feeler assembly including a tracing head for following the contour of a groove in the rim of a spectacle frame, a support member, means mounting said tracing head on said support member, said support member including an end portion remote from said tracing head and defining an axis, a base member, ball joint means operatively connected between said support member end portion and said base member, a cylindrical skirt member mounted coaxially on said support member intermediate said tracing head and said ball joint means and having a free edge facing said base member; and detecting means for detecting the position of said skirt member with respect to said base member, said detecting means being operatively connected to said displacement control means to more movement relative to said support plate in such a manner that the spectacle frame is maintained in contact with said tracing head of the feeler assembly.

12. A feeler assembly comprising a tracing head for following the contour of a groove in the rim of spectacle frame, a support member, said support member including an end portion remote from said tracing head; means mounting said tracing head on said support member, a base member, ball joint means mounting said support member on said base member, said ball joint means being disposed at said end portion of said support member remote from said tracing head between said support member and said base member, a skirt member mounted on said support member intermediate said tracing head and said ball joint means and facing said base member, and detecting means for detecting the position of said skirt member with respect to said base member in response to displacements of said tracing head in the groove of a spectacle frame rim.

13. A feeler assembly according to claim 12 wherein said ball joint means fixes said support member end portion against axial movement relative to said base member.

14. A feeler assembly according to claim 12, wherein said ball joint means comprises a first ball joint member secured on said end portion of said support member and a second ball joint member secured on said base member.

15. A feeler assembly according to claim 12, wherein said support member defines an axis and said base member extends generally at right angles to the axis of said support member in its undeflected position.

* * * * *